(12) United States Patent
Kodama et al.

(10) Patent No.: US 7,957,313 B2
(45) Date of Patent: Jun. 7, 2011

(54) DIAGNOSIS APPARATUS FOR OBJECT IN TDM COMMUNICATION SYSTEM AND METHOD FOR DIAGNOSING THE SAME

(75) Inventors: Tomoko Kodama, Kariya (JP); Eiichiro Kawakami, Chiryu (JP)

(73) Assignee: Denso Corporation, Kariya (JP)

( * ) Notice: Subject to any disclaimer, the term of this patent is extended or adjusted under 35 U.S.C. 154(b) by 209 days.

(21) Appl. No.: 12/220,482

(22) Filed: Jul. 23, 2008

(65) Prior Publication Data

US 2009/0034421 A1 Feb. 5, 2009

(30) Foreign Application Priority Data

Jul. 31, 2007 (JP) ................................. 2007-199265

(51) Int. Cl.
*H04J 3/14* (2006.01)

(52) U.S. Cl. .......................... 370/252; 370/347; 370/458

(58) Field of Classification Search .................. 370/229, 370/230, 235, 241–252, 315, 321, 345, 347, 370/349, 432, 442, 458

See application file for complete search history.

(56) References Cited

U.S. PATENT DOCUMENTS

| | | | |
|---|---|---|---|
| 5,586,305 A | | 12/1996 | Eidson et al. |
| 5,734,867 A | * | 3/1998 | Clanton et al. ............... 370/461 |
| 6,175,590 B1 | * | 1/2001 | Stein ............................. 375/225 |
| 6,813,253 B1 | * | 11/2004 | Yamaguchi ................... 370/330 |
| 6,956,923 B1 | * | 10/2005 | Younis et al. ................. 375/375 |
| 7,082,111 B2 | * | 7/2006 | Amouris ........................ 370/321 |
| 7,466,685 B2 | * | 12/2008 | Date et al. ..................... 370/350 |
| 2002/0163905 A1 | * | 11/2002 | Brabrand ....................... 370/347 |
| 2006/0274691 A1 | * | 12/2006 | Naguib et al. ................. 370/330 |
| 2007/0280110 A1 | * | 12/2007 | Murphy et al. ................ 370/235 |

FOREIGN PATENT DOCUMENTS

| | | |
|---|---|---|
| JP | 08-137515 | 5/1996 |
| JP | 2004-086367 | 3/2004 |
| JP | 2006-319394 | 11/2006 |
| JP | 2006-319568 | 11/2006 |

OTHER PUBLICATIONS

Office action dated Jun. 23, 2009 in corresponding Japanese Application No. 2007-199265.

* cited by examiner

*Primary Examiner* — Ricky Ngo
*Assistant Examiner* — Wei-Po Kao
(74) *Attorney, Agent, or Firm* — Harness, Dickey & Pierce, PLC

(57) ABSTRACT

A method and diagnosis apparatus are provided. A velocity measuring section measures a bit length of communication carried out between nodes based upon a communication signal inputted from a communication bus. The measured bit length is input to a control section, which sets a bit length based upon input from the velocity measuring section and arranges the communication section to decode the communication signal. The communication section specifies a frame reception time and a frame ID as an identification code of a time slot in which a frame is transmitted. Each time the frame is received after setting the bit length, the control section records information of the frame reception time and the frame ID inputted from the communication section in a log file. The control section determines whether the frame is transmitted in a constant period from each time slot based upon the content of the log file.

14 Claims, 9 Drawing Sheets

FIG. 10

| | PERIODIC TRANSMISSION FRAME | | | | | | | EVENT TRANSMISSION FRAME | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| CYCLE 0 | | | | | | | | | | | | | | |
| CYCLE 1 | | | | | | | | | | | | | | |
| CYCLE 2 | | | | | | | | | | | | | | |
| CYCLE 3 | | | | | | | | | | | | | | |
| CYCLE 4 | | | | | | | | | | | | | | |
| CYCLE 5 | | | | | | | | | | | | | | |
| CYCLE 6 | | | | | | | | | | | | | | |
| CYCLE 7 | | | | | | | | | | | | | | |
| CYCLE 8 | | | | | | | | | | | | | | |
| CYCLE 9 | | | | | | | | | | | | | | |
| CYCLE 10 | | | | | | | | | | | | | | |
| CYCLE $\alpha-1$ | | | | | | | | | | | | | | |

DIAGNOSIS APPARATUS FOR OBJECT IN TDM COMMUNICATION SYSTEM AND METHOD FOR DIAGNOSING THE SAME

CROSS REFERENCE TO RELATED APPLICATIONS

The present application is based on and claims priority to Japanese Application No. JP 2007-199265, filed on Jul. 31, 2007, the entire contents of which are incorporated herein by reference.

BACKGROUND OF THE INVENTION

1. Field of the Invention

The present invention relates to a diagnosis apparatus and method and, more particularly, to a diagnosis apparatus connected to a communication bus of a time-division multiplex (TDM) communication system to diagnose the communication system from a communication signal flowing through the communication bus.

2. Background Information

Conventional TDM communication system are known including event trigger communication systems and time trigger communication systems as described for example, in JP2006-319394A.

The event trigger communication system is so constructed that transmission object data is transmitted and received between nodes only when each node outputs a communication demand or request along with occurrence of an event enabling the node to acquire the right to transmit.

The time trigger communication system is so constructed that a certain time interval associated with a communication cycle is divided into a plurality of time slots. Non-overlapping individual time slots are assigned to respective nodes and each node transmits data in the assigned individual time slot.

In order to manage the time trigger communication system, it is necessary to set a communication schedule to each node through various communication parameters such as the number of time slots, a bit length, a slot length and a frame length. These communication parameters are required to be determined in consideration of factors such as a clock precision and a communication bus delay. Therefore, in the time trigger-type communication system when suitable factors are not sufficient or are not present, there can be cases where the communication system can not operate in accordance with design parameters.

Further, since data transmission timing from each node is defined by the time slot in the time trigger communication system, when generation of the transmission object data is not completed in time for transmission in the proper slot associated with the transmission timing due, for example, to execution delay of an application program, the transmission object data can not be transmitted from the associated node, creating a state where the node is free from transmitting the data.

As described above, there can be cases where the time trigger communication system does not normally operate due to various causes. Therefore, conventionally, a diagnosis apparatus can be used to determine whether communication in the communication system is properly carried out.

Conventional diagnosis methods are also known for diagnosing a time trigger communication system where, for example, a communication signal from the communication system is decoded and then recorded. A designer then analyzes the recorded content with a computer for diagnosis. In another conventional diagnosis method, a diagnosis apparatus is arranged to be operated in synchronization with a time trigger communication system by setting a communication schedule in coordination with the diagnosis apparatus and diagnosing the time trigger communication system from the synchronized state.

The conventional diagnosis methods, however, have the following disadvantages. For example, in the method of diagnosing the communication system where the communication signal is decoded and then recorded and a designer analyzes the recorded content with a computer for diagnosis, the content of the communication signal can be recognized as codes of "0" and "1", but potentially abnormal time-based behavior associated with the transmission action of the frame can not be recognized. Accordingly, the communication system can not be diagnosed in real time.

In the method of making the diagnosis apparatus operate in synchronization with the communication system, when an erroneous communication parameter is set in the diagnosis apparatus, based on synchronized operation, an appropriate diagnosis can not be carried out. In addition, since the setting error of the communication parameter is difficult to be recognized, a designer or troubleshooter may spend time for wasteful consideration attempting to solve the communication system failure.

A technology for automatically setting the communication schedule to the diagnosis apparatus is described in JP2006-319394A. However, with regard the subject technology of JP2006-319394A when diagnosis of another communication system in addition to the time trigger communication system is desired, the diagnosis apparatus is arranged to be operated to be synchronized with the communication system by acquiring the communication schedule from a gateway unit connecting these networks. Therefore, such a method can not be used other than in an environment where the different communication systems are provided together.

SUMMARY OF THE INVENTION

The present invention is made in view of the foregoing problems and it is an object of the present invention to provide a diagnosis apparatus which can easily diagnose whether a transmission action of data is appropriately carried out from each node in a time-division multiplex (TDM) communication system of a time trigger type.

A diagnosis apparatus in a first aspect of the present invention is used in connection to a communication bus of a TDM communication system of a time trigger type in which each node periodically transmits a frame. In the exemplary system, each of a plurality of time slots is assigned in advance to each node. In the present system, an identification code of the time slot for transmitting the frame is written in the frame transmitted from each node. A diagnosis apparatus as described herein is used for diagnosing such a TDM communication systems.

The diagnosis apparatus includes signal processing means for decoding a communication signal inputted from the communication bus to specify an identification code written in the frame and a reception time of the frame contained in the communication signal and reception history storage means for storing the reception time and the identification code of the frame specified by the signal processing means.

Further, the diagnosis apparatus includes transmission period estimating means for estimating a transmission period of the frame transmitted in the time slot that associated with the diagnosis object based upon information of the reception time and the identification code stored in the reception history storage means. The diagnosis apparatus further includes transmission period failure determining means for determining whether the frame is transmitted in the time slot associated with a diagnosis object in the transmission period estimated by the transmission period estimating means after estimating the transmission period by the transmission period estimating means. It will be understood that the estimate is based upon the reception time and the identification code specified by the signal processing means. In addition, the diagnosis apparatus includes notice means for notifying a failure of the communication when the transmission period failure determining means determines that the frame is not transmitted in the estimated transmission period.

Prior to diagnosis of the communication system using the above described diagnosis apparatus, the signal processing means is adapted to be capable of decoding the communication signal transmitted from the communication system, corresponding to a communication velocity of the communication system as the diagnosis object. The signal processing means may be designed in advance to operate in correspondence with the communication velocity of the communication system or may be arranged to decode the communication signal to correspond to a communication velocity inputted from an operator through input means.

An operator connects such diagnosis apparatus to the communication bus. The communication signal is decoded in the diagnosis apparatus to check whether the frame is transmitted in the time slot associated with the diagnosis object in a constant period. Accordingly, by using the diagnosis apparatus, an operator can check whether the frame is transmitted in a constant period without the need for synchronizing the diagnosis apparatus with the communication system.

That is, an operator can check in a simple way whether the frame is transmitted in a proper period from each node without failure and whether the application program normally generates data in each node without delay, even without synchronizing the diagnosis apparatus with the communication system by setting various parameters to the diagnosis apparatus. Thus an operator can diagnose whether the communication system operates normally. Therefore, according to the first aspect of the present invention, the communication system can be easily diagnosed by checking, with respect to time, whether the transmission action of the data is properly carried out from each node.

It should be noted that the diagnosis apparatus may be arranged to define the time slot associated with the diagnosis object according to a command from a user inputted through the input means. In addition, the time slot associated with the diagnosis object may be defined in advance at a designing stage. When all time slots are used for the time slot associated with the diagnosis object, the diagnosis apparatus can diagnose all the time slots.

The diagnosis apparatus may further include predicting means for predicting, when the diagnosis apparatus receives the transmitted frame in the time slot associated with the diagnosis object, the next reception time of the frame transmitted in the same time slot, based upon the reception time of the frame and the transmission period of the frame estimated by the transmission period estimating means.

The diagnosis apparatus may further include deviation calculating means for calculating, when the frame transmitted in the time slot associated with the diagnosis object is received, a deviation between the reception time of the frame and the reception time of the frame predicted at the previous time by the predicting means. In addition, the transmission period failure determining means may be arranged to determine whether the frame is transmitted in the transmission period estimated by the transmission period estimating means in the time slot associated with the diagnosis object, based upon the deviation calculated by the deviation calculating means.

In the above described way, when the reception time of the next frame is predicted at the reception time of the present frame and it is further determined whether the frame is transmitted at the transmission period estimated by the transmission period estimating means in the time slot associated with the diagnosis object, it can be determined whether the frame is transmitted in a proper transmission period in real time, thereby notifying a communication failure quickly. When occurrence of the failure is notified, the cause of the failure occurrence can be immediately investigated and the communication system can be quickly corrected.

The transmission period failure determining means may be more specially arranged to determine that the frame is not transmitted in the transmission period estimated by the transmission period estimating means when the deviation exceeds a given reference value and that the frame is transmitted in the transmission period estimated by the transmission period estimating means when the deviation is less than the given reference value.

Further, the diagnosis apparatus includes communication velocity measuring means for measuring a communication velocity in communication between the nodes through the communication bus based upon the communication signal inputted from the communication bus. The signal processing means may be arranged to decode the communication signal inputted from the communication bus according to the communication velocity measured by the communication velocity measuring means to specify the identification code written in the frame and the reception time of the frame contained in the communication signal.

When the diagnosis apparatus is arranged in such a way, an operator can properly diagnose various diagnosis communication systems without recognition of the communication velocity. That is, since it is not necessary for an operator to input the communication velocity in the diagnosis apparatus, the operator does not need to set the communication velocity to the diagnosis apparatus at diagnosis and therefore, can perform the diagnosis of the communication system in an easy way.

Incidentally, when a communication parameter representing a communication schedule of the communication system, such as a slot length, is set to the diagnosis apparatus to synchronize the diagnosis apparatus with the communication system, it can be checked whether the frame is periodically transmitted. In addition, for example, another check as to whether the frame is normally accommodated in the time slot can be made.

As in the case of the conventional diagnosis apparatus, when an operator performs input of the communication parameter to set the communication schedule to the diagnosis apparatus and to synchronize the diagnosis apparatus with the communication system, a correct communication schedule may not be set to the diagnosis apparatus due to an input error of the operator and so on, resulting in an erroneous diagnosis.

Accordingly, the exemplary diagnosis apparatus may be provided with means for setting the communication parameter based upon the communication signal inputted from the communication bus. Specifically, the diagnosis apparatus may include frame failure determining means for determining whether each node normally transmits the frame in the assigned time slot from the communication signal flowing in the communication bus, based upon the communication parameter that is set in advance. The diagnosis apparatus may further include parameter setting means for deriving the communication parameter to be set to the frame failure determining means based upon the communication signal inputted from the communication bus and sets the derived communication parameter to the frame failure determining means. The notice means may be arranged to provide a notification of a failure of the communication when the frame failure determining means determines that the frame is not normally transmitted.

According to the diagnosis apparatus arranged in the above described way, the diagnosis apparatus can monitor the communication signal in synchronization with the communication system without requiring input of the communication parameter by an operator and therefore, can perform a detailed check not only about absence of transmission of the frame but also whether the frame is transmitted in such a manner as to be within the proper time slot. Thus the communication system can be diagnosed in more detail.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 10 is an diagram illustrating a construction of an exemplary frame transmission table.

DETAILED DESCRIPTION OF THE EXEMPLARY EMBODIMENTS

Figure 1:
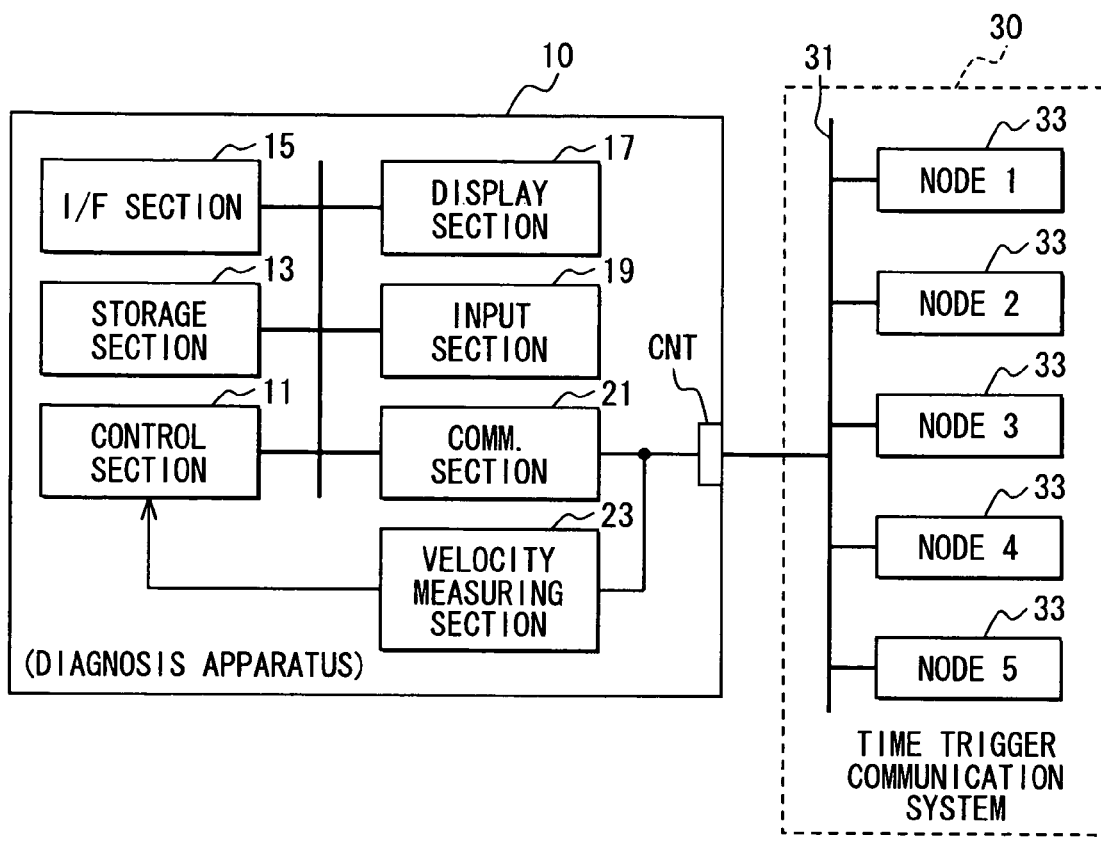
FIG. 1 is a block diagram illustrating a construction of an exemplary diagnosis apparatus in accordance with an embodiment.

Hereinafter, an embodiment of the present invention will be explained with reference to the drawings. FIG. 1 is a block diagram showing a construction of a diagnosis apparatus 10 in an exemplary embodiment. The diagnosis apparatus 10 in the present embodiment is arranged to be connected to a communication bus 31 used for transmission of a communication signal in a communication system 30 as a diagnosis object to diagnose the communication system 30.

The communication system 30 set as the diagnosis object in the diagnosis apparatus 10 in the present embodiment is a TDM communication system of a time trigger type. Each node 33 constituting the communication system 30 transmits a communication signal through the communication bus 31 in accordance with the above described time trigger method in order to perform communication with other nodes 33.

Figure 2:
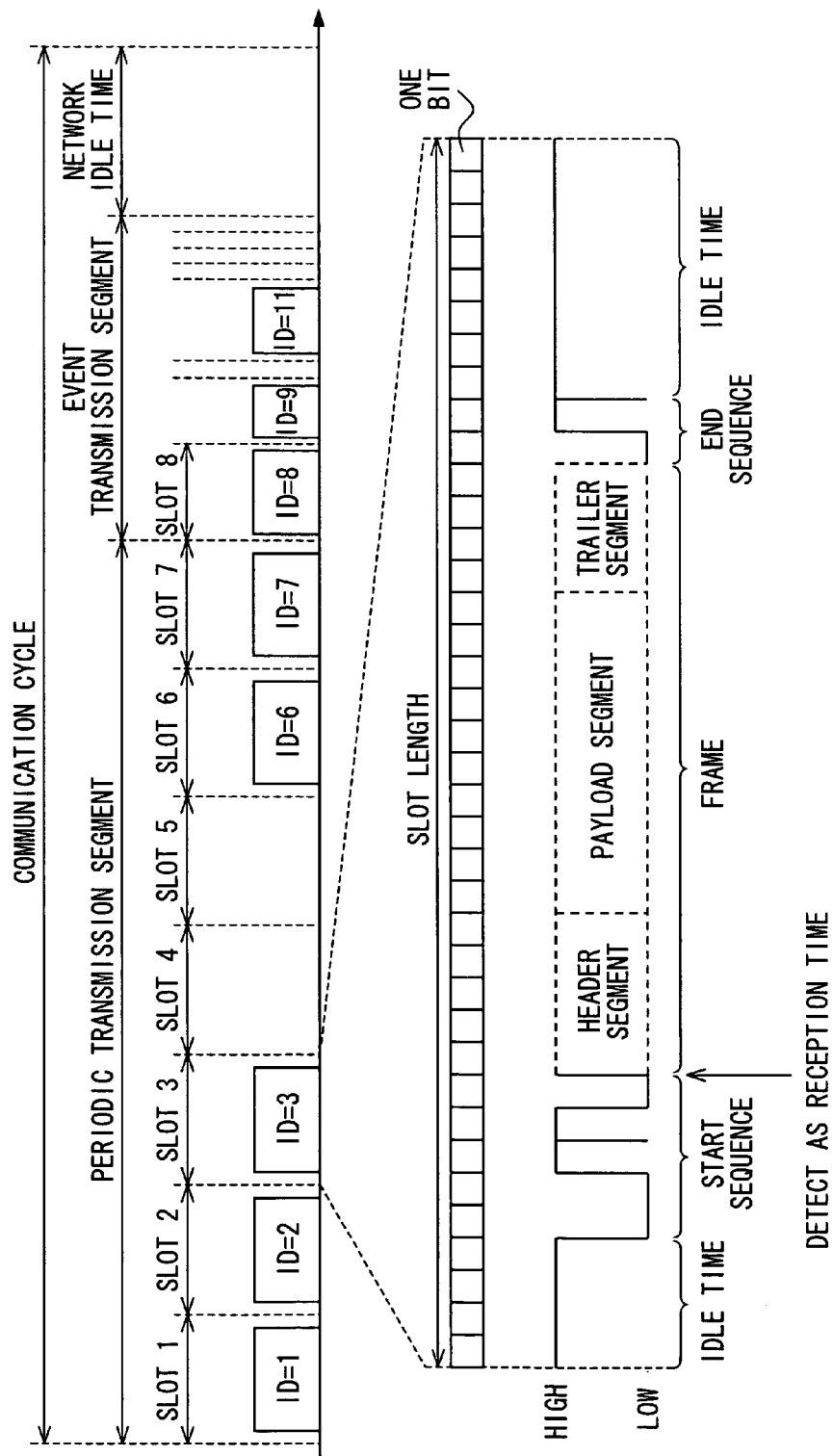
FIG. 2 is a diagram illustrating a mode of communication in a communication system in accordance with an embodiment.

More specially, in the communication system 30, a constant time is defined as a communication cycle. The constant time is divided into a periodic transmission segment, an event transmission segment and a network idle time. FIG. 2 shows a mode of communication during one communication cycle.

As shown in FIG. 2, the periodic transmission segment is divided into a plurality of time slots and a time length of the periodic transmission segment is defined by a product of a slot length and the number of the time slots constituting the periodic transmission segment. Hereinafter, the time slots constituting the periodic transmission segment are expressed particularly as periodic transmission slots.

The slot length and the slot number of the periodic transmission slot in the periodic transmission segment are defined at the time of designing the communication system by a designer, but the slot length of each periodic transmission slot is set as the same value as that in the periodic transmission segment.

Each periodic transmission slot is assigned to any one of the plurality of nodes 33 constituting the communication system 30. When the periodic transmission slot that is assigned to a node 33 in the communication system 30 comes in the periodic transmission segment, the corresponding node 33 sends out a frame of transmission stand-by to the communication bus 31. Hereinafter, the frame transmitted in the periodic transmission slot is particularly expressed as a periodic transmission frame.

FIG. 2 further shows a bit stream of the periodic transmission slot. As shown in FIG. 2, in the periodic transmission slot, a start sequence is transmitted prior to transmission of a frame after elapse of an idling time and thereafter, the frame is transmitted. After the transmission of the frame, an end sequence is transmitted. The bit number of the start sequence and the bit number of the end sequence are defined to fixed values by a protocol.

The periodic transmission frame is composed of a header segment, a payload segment and a trailer segment. Information such as a frame ID, a payload length and a cycle counter is written in the header segment. The frame ID shows an identification code of the time slot.

That is, in the communication system 30 of the present embodiment, the header segment of the frame includes an identification code of the time slot written therein in which the corresponding frame is transmitted. In the communication system 30, the slot numbers are in sequence number assigned to the respective time slots in the order from the head in the communication cycle as the identification codes to the time slots, and the slot number is written as the frame ID in the header segment.

The cycle counter shows the number of the coming times of the communication cycles. In the communication system 30, each node 33 is constructed in such a manner that the cycle counter is reset when one communication cycle is repeated α times. The payload length written in the header segment shows a length of the payload segment.

In addition, a data body of a transmission object is written in the payload segment and a CRC value is written in the trailer segment. Each of the header segment and the trailer segment has a length defined to a fixed value by a protocol. In the communication system 30 used as a diagnosis object in the present embodiment, a frame length is defined based upon the payload length set by a designer.

The event transmission segment is formed of a collection of time slots each having a variable length. In the event transmission segment, the slot length is expanded by the integral multiple of the minimum unit along with transmission of the frame. Hereinafter, the time slots constituting the event transmission segment are expressed as event transmission slots and the frame transmitted through the event transmission slot is expressed as an event transmission frame.

In the event transmission segment, the event transmission slot not being accompanied by transmission of the frame has a length which is set to the minimum unit, but the length of the event transmission segment itself does not change regardless of a change of each slot length and is maintained to a fixed value.

Since the slot length in the event transmission segment thus varies depending on presence/absence of transmission of the frame, the event transmission segment is used for transmitting non-periodic data from each node 33, while the periodic transmission segment is used for transmitting periodic data.

That is, in a case where a normal communication is carried out in the communication system 30 and used as the diagnosis object in the present embodiment, a frame is transmitted in a period of the integral multiple of the communication cycle in each periodic transmission slot. For example, in the periodic transmission slot of the slot number 5, the frame is transmitted in a period one time that of the communication cycle and in the periodic transmission slot of the slot number 6, the frame is transmitted in a period twice that of the communication cycle as shown for example in FIG. 10.

However, in a case where the communication system 30 does not normally operate, a partial transmission of a frame occurs and therefore, the frame is not transmitted in a constant period from the periodic transmission slot. An example of the cause of partial frame transmission includes a case where generation of data in relation to the transmission object is not smoothly made in the corresponding node and therefore, the data generation is not ready at the time when the assigned time slot is required to be filled. In such a case, the frame is not transmitted at a cycle to be transmitted from the node and the corresponding frame is supposed to be transmitted at the next cycle.

In a case where the communication system 30 is a system mounted in a vehicle, for example, a reduction in voltage due to battery consumption causes an operation of the node 33 to be unstable and therefore, the frame transmission may not properly occur and state where the slot is free from a transmission may occur.

The diagnosis apparatus in the present embodiment 10 detects such a state of being free from the frame transmission to diagnose normality/abnormality of the communication system and realizes this diagnosis function without requiring for an operator to input the detailed communication parameter.

Next, the construction of the diagnosis apparatus 10 in the present embodiment accomplishing this diagnosis function will be explained in detail. The diagnosis apparatus 10 in the present embodiment is, as shown in FIG. 1, provided with a control section 11, a storage section 13, an interface (I/F) section 15, a display section 17, an input section 19, a communication section 21 and a velocity measuring section 23.

The control section 11 is provided with a micro computer and executes various calculation processing by the micro computer to perform integral control of each section in the diagnosis apparatus 10. The storage section 13 is formed of a semiconductor memory and is used for storing data acquired as a result of the calculation processing by the control section 11. Further, the interface section 15 is arranged to be capable of communicating with an external device. When the interface section 15 is connected to the external device, the communication with the external device is made, for example, the interface section 15 is controlled by the control section 11 to output data to, for example, a log file, to be described later, stored in the storage section 13 to the external device.

The input section 19 is formed of an operational key or keys, a pointing device and so on and serves as a user interface. Further, the display section 17 is formed of a liquid crystal display, a speaker and so on. The display section 17 is controlled by the control section 11 to display an image based upon an image data inputted from the control section 11, on a screen of the liquid crystal display and also outputs various kinds of sounds from the speaker.

Figure 3:
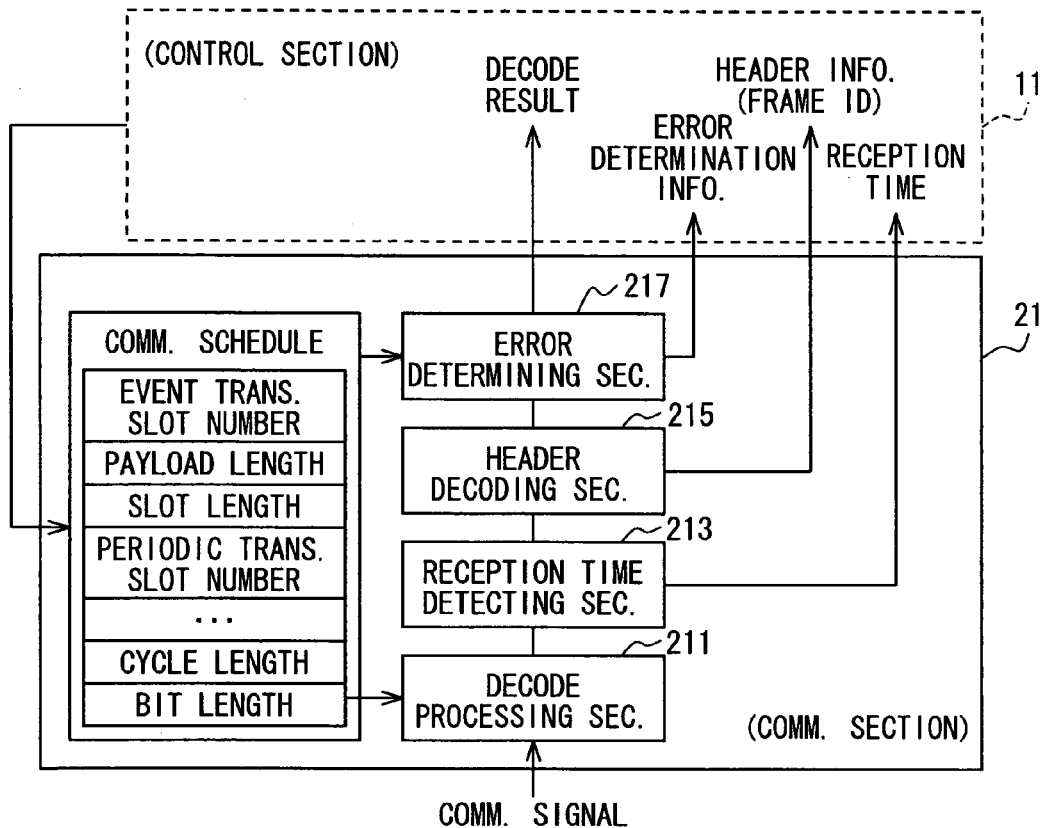
FIG. 3 is a block diagram illustrating a detailed construction of a communication section in accordance with an embodiment.

The communication section 21 is connected to the communication bus 31 of the communication system 30 through a connector CNT to decode a communication signal flowing in the communication bus 31. Then, the communication section 21 inputs the decode result, that is, bit lines acquired by converting the communication signal into "0" or "1", to the control section 11. FIG. 3 is a block diagram showing a detail construction of the communication section 21.

The communication section 21 of the present embodiment executes the communication processing at a data link layer level and a physical layer as is typically associated with a multi-layered communication protocol adopted in the communication system 30. As shown in FIG. 3, the communication section 21 is provided with a decode processing section 211, a reception time detecting section 213, a header decoding section 215 and an error determining section 217.

The decode processing section 211 decodes the communication signal inputted from the communication bus 31 and outputs the decode result. It is necessary to set a bit length, which is the transmission time per one bit, of the communication signal of the decode object to the communication section 21 prior to activation of the decode processing section 211. In the present embodiment, the control section 11 sets the bit length to the communication section 21 according to the measurement result of the velocity measuring section 23 to be described later. When the bit length is thus set, the decode processing section 211 decodes the communication signal inputted from the communication bus 31 corresponding to the set bit length.

The reception time detecting section 213 detects reception of the frame according to the decode result by the decode processing section 211 and detects the reception time of the frame based upon a value of a built-in timer. For example, the reception time detecting section 213 detects the start sequence from the decode result and detects a timer value as a reception time at the detection point of the start sequence. Then, the detected reception time is inputted to the control section 11.

Further, the header decoding section 215 analyzes the bit line as the above decode result and extracts each value of a frame ID, a payload length and a cycle counter of the reception frame written in the head segment from the head segment of the reception frame appearing after the start sequence. The header decoding section 215 inputs the extracted information such as each value of frame ID, payload length and cycle counter to the control section 11 as header information.

The error determining section 217 analyzes the bit line inputted from the decode processing section 211 according to the prescribed communication parameter and determines whether the frame transmitted in the periodic transmission slot is accommodated in the periodic transmission slot to detect a transmission failure of the frame.

FIG. 4 shows a method of making an error determination by the error determining section 217. The error determining section 217 determines whether the reception frame is associated with the periodic transmission frame from the frame ID written in the header segment of the reception frame. When the reception frame is associated with the periodic transmission frame, a terminal end of the frame appearing after the start sequence, a terminal end of the end sequence subsequent to the terminal of the frame and a terminal end of the time slot are specified according to information of the slot length and the payload length in advance set as the communication parameters.

Figure 4A:
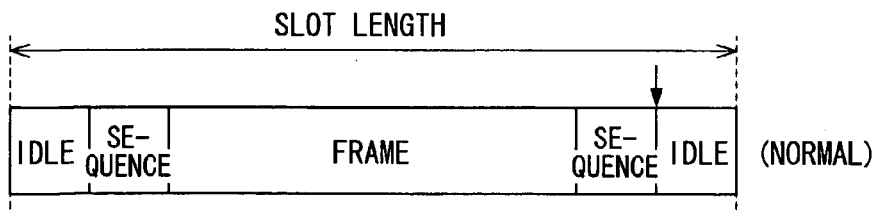
FIG. 4A is a diagram illustrating a normal frame timing with respect to a slot size.
Figure 4B:
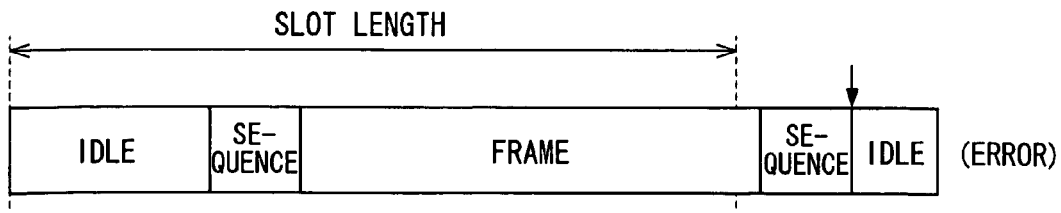
FIG. 4B is a diagram illustrating an error determination by an error determination section, the error associated with a frame timing with respect to a slot size in accordance with an embodiment.

When the terminal end of the end sequence is positioned beyond the terminal end of the time slot in time, it is determined that the reception frame is not accommodated in the periodic transmission slot. When the terminal end of the end sequence is in agreement with the terminal end of the time slot or positioned before the terminal end of the time slot in a time line, it is determined that the reception frame is accommodated in the periodic transmission slot. FIG. 4A is a diagram showing a state where the reception frame is accommodated in the periodic transmission slot. FIG. 4B is a diagram showing a state where the reception frame is not accommodated in the periodic transmission slot.

When the error determining section 217 thus makes the determination as to the reception frame, the error determination information representing the determination result is inputted to the control section 11. That is, when it is determined that the reception frame is accommodated in the periodic transmission slot, the error determining section 217 inputs the error determination information indicating a normal condition to the control section 11. When it is determined that the reception frame is not accommodated in the periodic transmission slot, the error determining section 217 inputs the error determination information indicating an error condition that the frame duration exceeds the slot duration to the control section 11.

Since the error determining section 217 in the diagnosis apparatus 10 operates as described above, the error determining section 217 can not be activated without setting the bit length, the payload length and the slot length of the periodic transmission slot to the communication section 21. Therefore, during processing to be described later, the present embodiment determines the communication parameters to be set to the communication section 21 while acting as the second diagnosis processing means.

The velocity measuring section 23 provided in the diagnosis apparatus 10 of the present embodiment is connected to the communication bus 31 through the connector CNT and detects edges of the communication signal inputted from the communication bus 31 to measure a communication velocity of communication carried out between the nodes 33. More specially, the velocity measuring section 23 of the present embodiment measures a bit length equivalent to the communication velocity and inputs the measurement result to the control section 11. It should be noted that the communication velocity corresponds to a reciprocal number of the bit length.

Figure 5A:
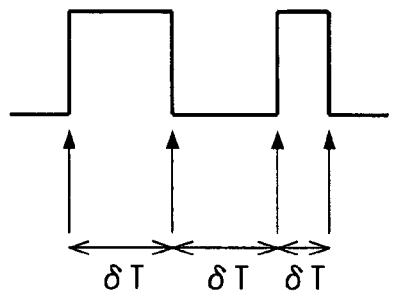
FIG. 5A is a diagram illustrating a measurement method of a bit length in accordance with an embodiment.
Figure 5B:
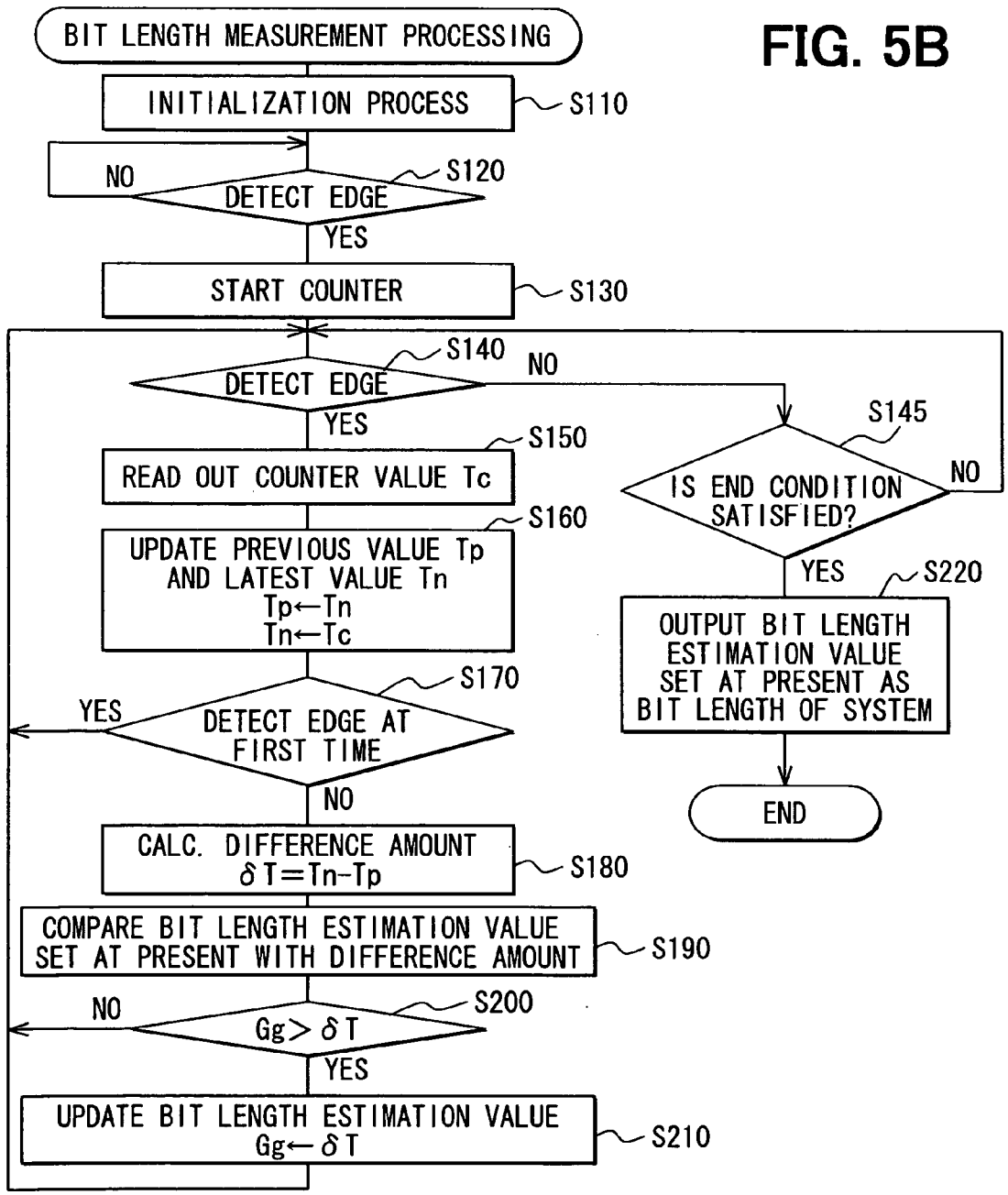
FIG. 5B is a flow chart illustrating exemplary bit length measurement processing performed by a velocity measuring section in accordance with an embodiment.

FIG. 5A shows a measurement method of a bit length performed in the velocity measuring section 23. FIG. 5B is a flow chart showing the measurement processing of the bit length performed by the velocity measuring section 23.

As shown in FIG. 5A, the velocity measuring section 23 of the present embodiment detects edges of a communication signal to measure a time length $\delta T$ between the edges, detecting the minimum value of $\delta T$ in a certain period as the bit length. However, since the communication signal contains a noise component, according to the present embodiment, for accurately measuring the bit length, a voltage value of the communication signal is detected plural times in a sampling period sufficiently smaller than the minimum value among the bit lengths that the communication system 30 can tolerate and still achieve timing constraints. Only in a case where, after switching to upward or downward, the voltage value continues to be held in an upward or downward state plural times, the switching to the upward or downward is detected as an edge.

More specially, the velocity measuring section 23 detects the bit length according to the procedure shown in FIG. 5B. When the velocity measuring section 23 is controlled by the control section 11 to start the bit length measurement processing shown in FIG. 5B, an initialization process is first executed at S110. Here, the maximum value among the bit lengths which the communication system 30 as the diagnosis object can tolerate according to the relevant communication standard is set as a bit length estimation value Gg. In addition, values of parameters Tp and Tn to which the edge detecting time is set are initialized to zero.

When the above described process is completed, the velocity measuring section 23 stands by until the edge is detected from the communication signal inputted from the communication bus 31 at S120. When the edge is detected, corresponding to YES at S120, the built-in counter is made to start at S130. However, the counter is arranged to be capable of counting time at a unit smaller enough than the minimum bit length which the communication system 30 can tolerate according to the relevant standard.

When the process at S130 is completed, the velocity measuring section 23 stands by until the next edge is detected or the end condition of the bit length measurement process is satisfied at S140 and at S145. More specially, in the present embodiment, when a certain time elapses after start of the bit length measurement process, processing proceeds to S220 assuming that the end condition of the bit length measurement process is satisfied.

Here, when the next edge is detected, corresponding to YES at S140, the velocity measuring section 23 reads out a value Tc of the counter at S150 and updates a value of the parameter Tp to a value of the parameter Tn set at present and also updates the value of the parameter Tn to the value Tc of the counter read out at S160. At the time of detecting the first edge after start of the bit length measurement process, corresponding to YES at S170, the velocity measuring section 23 stands by until thereafter, processing proceeds to S140, wherein the velocity measuring section 23 detects the next edge or until the end condition of the bit length measurement process is satisfied at S140 and at S145.

When the new edge is detected, corresponding to YES at S140, the velocity measuring section 23 reads out the counter value Tc from the counter at S150, the velocity measuring section 23 updates the values of the parameters Tp and Tn by the aforementioned method at S160. That is, the velocity measuring section 23 sets the counter value at the time of previously detecting the edge to the parameter Tp and sets the counter value Tc at the time of detecting the edge to the parameter Tn. Thereafter, the velocity measuring section 23 determines that the edge detection is not the first instance of edge detection, corresponding to NO at S170, and calculates a difference amount $\delta T$ at S180 based on the relation expressed by $\delta T = Tn - Tp$.

When the process is completed, the velocity measuring section 23 compares the calculated difference amount δT with the presently set bit length estimation value Gg at S190. When it is determined that the difference amount δT is less than the bit length estimation value Gg, corresponding to YES at S200, the velocity measuring section 23 updates the bit length estimation value Gg to the value of the difference amount δT at S210. Thereafter, processing proceeds to S140.

When it is determined that the calculated difference amount δT is more than the bit length estimation value Gg, corresponding to NO at S200, the velocity measuring section 23 does not update the bit length estimation value Gg, and processing proceeds to S140. In addition, the processes at S140 to S210 are repeatedly executed until the end condition is satisfied.

When the end condition is satisfied, corresponding to YES at S145, processing proceeds to S220, wherein the velocity measuring section 23 inputs the bit length estimation value Gg set at present to the control section 11 as a bit length Gb of the communication system 30. Thereafter, the bit length measurement process ends.

Figure 6:
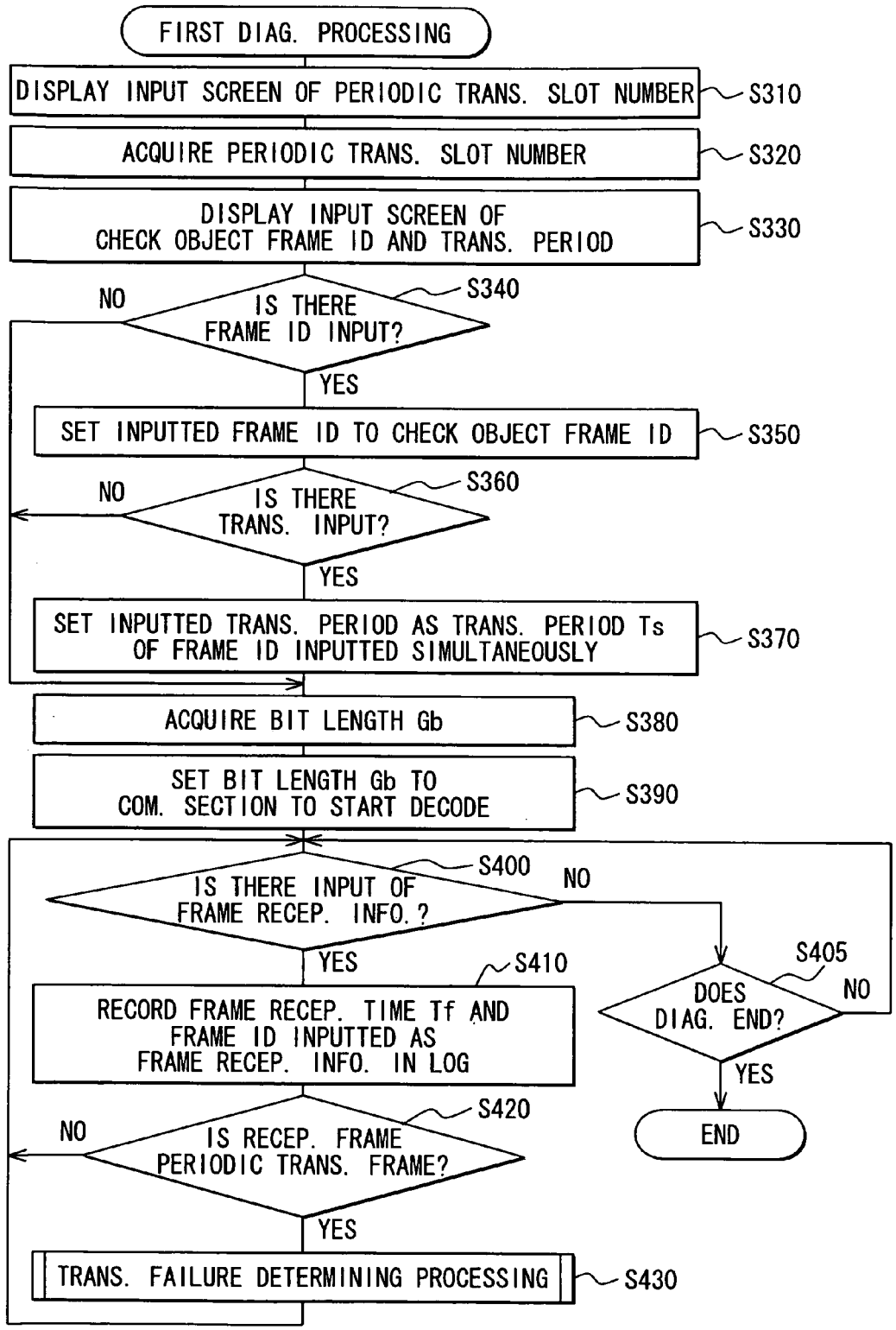
FIG. 6 is a flow chart illustrating diagnosis processing performed by an exemplary control section in accordance with an embodiment.

Next, the processing for carrying out the diagnosis of the communication system 30 by the control section 11 will be explained with reference to FIG. 6 to FIG. 10. The diagnosis apparatus 10 of the present embodiment is arranged to be capable of carrying out two kinds of diagnoses. When an execution command of the first diagnosis processing is inputted from an outside as an operator to the diagnosis apparatus 10 through the input section 19 in a state where the communication bus 31 of the communication system 30 is connected to the diagnosis apparatus 10, the first diagnosis processing is executed in the control section 11. FIG. 6 is a flow chart showing the first diagnosis processing executed by the control section 11.

By starting with the first diagnosis processing, the control section 11 displays on the display section 17 an input screen of the periodic transmission slot number for making an operator input the periodic transmission slot number in the communication system 30 as the diagnosis object at S310. In addition, the control section 11 acquires information of the periodic transmission slot number from an outside through the input section 19 at S320.

When the above described process is completed, the control section 11 displays on the display section 17 an input screen for making an operator input a check object frame ID and a transmission period at S330. In the first diagnosis processing, it is checked whether the frame is transmitted in a constant period in the periodic transmission slot. The diagnosis apparatus 10 is arranged in such a manner that the periodic transmission slot of an object for checking whether the frame is transmitted in a constant period can be limited to a part of the periodic transmission slot group constituting the periodic transmission segment. Herein, an operator is required to input the frame ID corresponding to the periodic transmission slot of the object to be checked on the input screen through the input screen.

However, since the input is optional, an input screen is displayed at S330, such as a graphic user interface (GUI), which is provided with an input column of the transmission period for each input column of the check object frame ID and which is further provided with an input completion button acting as an input object for inputting a command meaning "input completion." Even when the check object frame ID and the transmission period are not inputted, the process transfers to the next step at a point where the input completion button is pushed or otherwise operated.

That is, when the input completion button is operated, processing proceeds to S340, where the control section 11 determines whether the frame ID is inputted through the input screen. When it is determined that the frame ID is inputted, corresponding to YES at S340, the frame ID inputted through the input screen is set to the check object frame ID at S350.

When the above described process is completed, the control section 11 determines whether the transmission period is inputted through the input screen at S360. When it is determined that the transmission period is inputted, corresponding to YES at S360, the transmission period inputted through the input screen is set as a transmission period Ts of the frame ID inputted to the input column of the check object frame ID arranged to correspond to the input column of the transmission period at S370. Thereafter, processing proceeds to S380.

When it is determined that the frame ID is not inputted, corresponding to NO at S340, the control section 11 does not execute the processes of S350 to S370 and processing proceeds to S380. In addition, when the control section 11 determines that the transmission period is not inputted through the input screen, corresponding to NO at S360, processing proceeds to S380 without executing the process at S370.

When processing proceeds to S380, the control section 11 activates the velocity measuring section 23 to acquire a bit length Gb of the communication system 30 from the velocity measuring section 23. Then, the control section 11 sets the acquired bit length Gb to the communication section 21 to activate the decode processing section 211 at S390. When the decode processing section 211 is thus activated, each time the frame is received at the communication section 21, frame reception information containing information of a reception time Tf and header information of the frame is inputted from the communication section 21 to the control section 11.

When the process at S390 is completed, the control section 11 stands by until the frame reception information is inputted or a diagnosis end command is inputted from an outside through the input section 19 at S400 to S405. When the frame reception information is inputted from the communication section 21, corresponding to YES at S400, reception history information relating information of a reception time Tf of the frame to information of the frame ID based upon the frame reception information is recorded in a log file stored in the storage section 13 at S410.

Thereafter, the control section 11 determines whether the reception frame triggering the input of the frame reception information is the periodic transmission frame, based upon information of the frame ID inputted as the frame reception information at S420.

It should be noted that in the communication system 30 used as the diagnosis object in the present embodiment, the slot numbers starting with an initial value such as, for example, "1," are arranged in sequence number assigned to each slot in the order from the head of the communication cycle as shown in FIG. 2. Accordingly, based on the sequential arrangement, when it is determined at S420 that an initial value of the frame ID is smaller than the periodic transmission slot number acquired at S320, the corresponding reception frame is associated with the periodic transmission slot. If not, it is determined that the corresponding reception frame is not associated with the periodic transmission slot.

Figure 7:
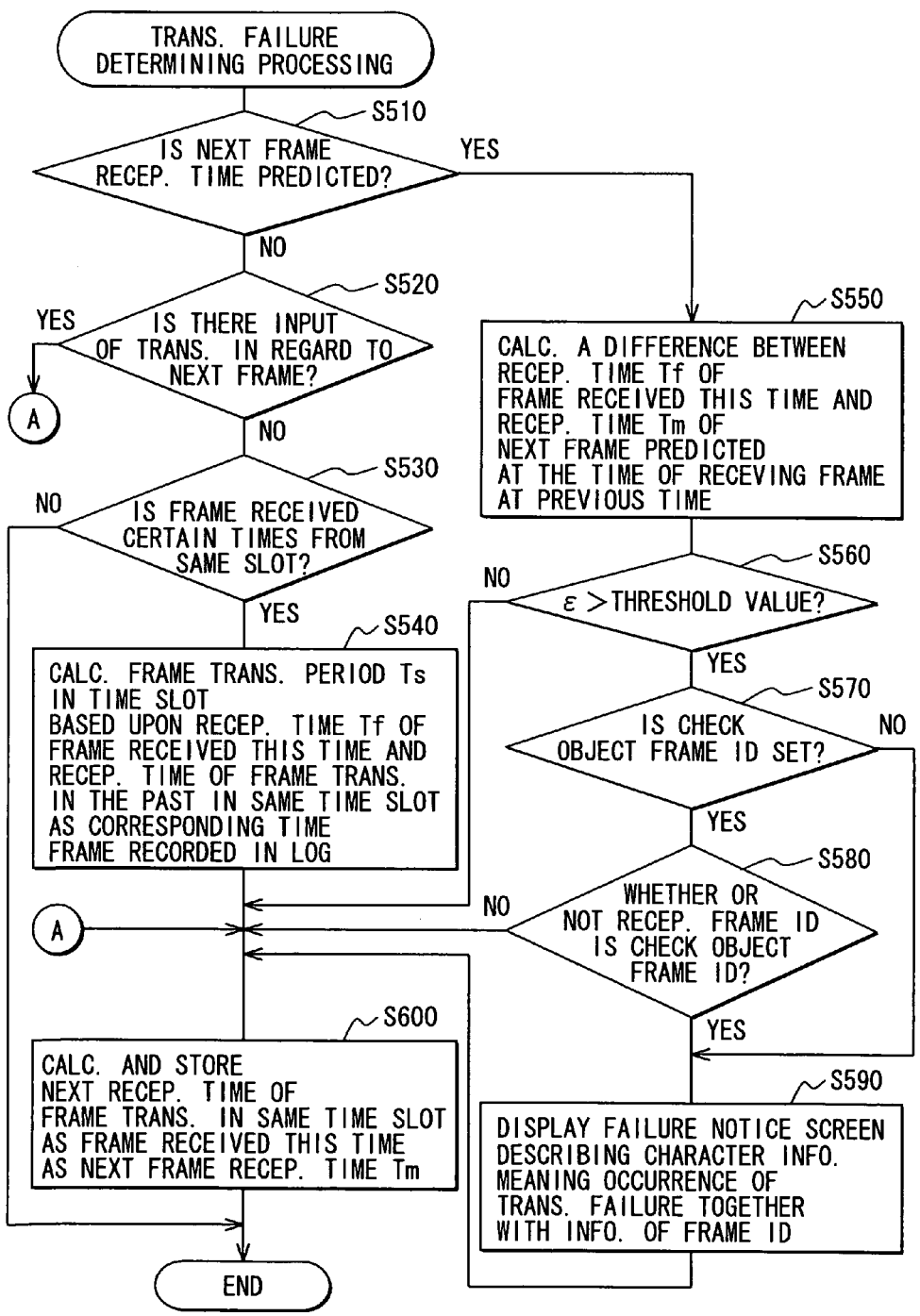
FIG. 7 is a flow chart illustrating transmission failure determining processing performed by an exemplary control section in accordance with an embodiment.

When it is determined that the reception frame is associated with the periodic transmission slot, corresponding to YES at S420, processing proceeds to S430, where the control section 11 executes transmission failure determining processing shown in FIG. 7. Thereafter, processing proceeds to S400.

When it is determined that the reception frame is not the periodic transmission slot, corresponding to NO at S420, processing proceeds to S400 without executing the process at S430 by the control section 11. Then the control section 11 stands by until new frame reception information is inputted from the communication section 21 or a diagnosis end command is inputted through the input section 19 at S400 to S405. When the diagnosis end command is inputted through the input section 19, the first diagnosis processing is completed.

Next, the transmission failure determining processing executed at S430 by the control section 11 will be explained. FIG. 7 is a flow chart showing the transmission failure determining processing executed by the control section 11. When the transmission failure determining processing is started, the control section 11 determines whether a frame having the same frame ID as that of the reception frame that triggered execution of the transmission failure determining processing has been previously received and the next frame reception time of a frame having the frame ID is already predicted. When it is determined that the next frame reception time is already predicted, corresponding to YES at S510, processing proceeds to S550. When it is determined that the next frame reception time is not predicted, corresponding to NO at S510, processing proceeds to S520.

The control section 11 determines at S520 whether the input of the transmission period in regard to the frame ID corresponding to the reception frame is performed through the input screen. When it is determined that the input of the transmission period is performed, corresponding to YES at S520, processing proceeds to S600 and when it is determined that the input of the transmission period is not performed, corresponding to NO at S520, processing proceeds to S530.

Further, when processing proceeds to S530, the control section 11 determines whether the frame is received a certain times in the same time slot as the time slot in which the reception frame at this time is transmitted. When it is determined that the frame is not received a certain times, corresponding to NO at S530, the control section 11 ends the transmission failure determining processing without executing the process after S540. When it is determined that the frame is received at a certain time, corresponding to YES at S530, processing proceeds to S540, where the control section 11 calculates a transmission period Ts of frames transmitted in the same time slot as the time slot of the received frame, from the reception time Tf of the received frame and the reception time of a past frame transmitted in the same time slot as the frame recorded in the log file.

At S540, for example, a difference between the reception time Tf of the received frame and the reception time of the frame previously transmitted in the same time slot, which difference can be referred to as a frame reception interval, is calculated as a transmission period Ts of the frame. Further, the frame reception interval in the same time slot is calculated by the number of times n based upon information of the present reception time and the frame reception times recorded in the log file up to the number n. The average of the frame reception intervals may be calculated as the transmission period Ts of the frame. In addition, among n frame reception intervals, one largest interval and one smallest interval may be eliminated to calculate an average interval of the remaining frame reception intervals (n−2) as a transmission period Ts of the frame.

When the process at S540 is completed, processing proceeds to S600, where the control section 11 predicts the next frame reception time Tm for the next frame transmitted in the same time slot as the received frame, based upon the calculated transmission period Ts. More specially, the transmission period Ts is added to the reception time Tf of the received frame to calculate the next frame reception time Tm at S600. Thereafter, the transmission failure determining processing ends.

When YES is determined at S520 and processing proceeds to S600, the control section 11 calculates or otherwise predicts the next frame reception time Tm of the frame transmitted in the same time slot as the received frame, based upon the transmission period Ts set in the frame ID that corresponds to the received frame at S370 by the aforementioned method. Thereafter, the transmission failure determining processing ends.

When YES is determined at S510 and processing proceeds to S550, the control section 11 calculates a deviation $\epsilon$ between the reception time Tf of the reception frame at this time and the next frame reception time Tm predicted at the time of receiving the frame transmitted at the previous time in the same time slot as the reception frame at this time. It will be appreciated that the deviation can be calculated according to the following relationship: $\epsilon=|Tf-Tm|$.

When processing at S550 is completed, processing proceeds to S560. When the control section 11 determines that the deviation $\epsilon$ is larger than the prescribed threshold value, corresponding to YES at S560, the control section 11 determines that the transmission failure occurs and processing proceeds to S570. When it is determined that the deviation $\epsilon$ is less than or equal to the prescribed threshold value, corresponding to NO at S560, the control section 11 determines that the transmission failure does not occur and processing proceeds to S600 without executing the processes S570 to S590, whereupon the next frame reception time Tm is predicted by the aforementioned method. It should be noted that in the present embodiment, for detecting a state of being free of transmission of a frame, the threshold value is preset to a value smaller than the minimum time of the communication cycle which the communication system 30 can tolerate.

Further, when processing proceeds to S570, where the control section 11 determines whether setting the check object frame ID is made at S350. When it is determined that this setting is made, corresponding to YES at S570, the control section 11 determines whether the frame ID of the reception frame is the check object frame ID at S580.

When it is determined that the frame ID of the reception frame is not the check object frame ID, corresponding to NO at S580, processing proceeds to S600 without executing the process at S590. When it is determined that the frame ID of the reception frame is the check object frame ID, corresponding to YES at S580, processing proceeds to S590, where the control section 11 displays a failure notice screen describing character information that a transmission failure occurs in the time slot corresponding to the frame ID, on the display section 17, thus notifying an operator that the transmission failure occurs at S590.

Thereafter, processing proceeds to S600, where the control section 11 predicts the next frame reception time Tm of the frame transmitted in the same time slot as the reception frame. Thereafter, the transmission failure determining processing ends.

When it is determined at S570 that the check object frame ID is not set, corresponding to NO at S570, processing proceeds to S590 without executing the process at S580. That is, regardless of the frame ID of the reception frame, the control section 11 displays a failure notice screen describing character information that a transmission failure occurs in the time slot corresponding to the frame ID, on the display section 17. Thereafter, processing proceeds to S600.

According to the first diagnosis processing, by executing the transmission failure determining processing each time a frame is received, a time slot in which a frame is not transmitted in a constant period is detected. When a time slot is detected without a frame, a notification of the failure of the communication system 30 is provided to an operator through the display section 17.

For example, in a case where a node, to which the periodic transmission slot corresponding to "frame ID=1" is assigned, is arranged to transmit a frame in a period that is twice the period of the communication cycle, a frame with an identity "frame ID=1" should normally be received by the diagnosis apparatus 10 according to a period twice that of the communication cycle.

However, in a case where a node can not transmit the frame at the time of the time slot due, for example, to delay of data generation, the diagnosis apparatus 10 can not receive the corresponding frame even at the next frame reception time that is predicted in advance. In addition, since by the time the next frame has received an excessive amount of time has passed since the original reception time, the deviation. $\epsilon$ is greater than a threshold value.

In the diagnosis apparatus 10, in a case where such deviation $\epsilon$ is detected, a notification of a state of being free from the frame transmission is provided to an operator by displaying the failure notice screen using the aforementioned method.

Figure 8:
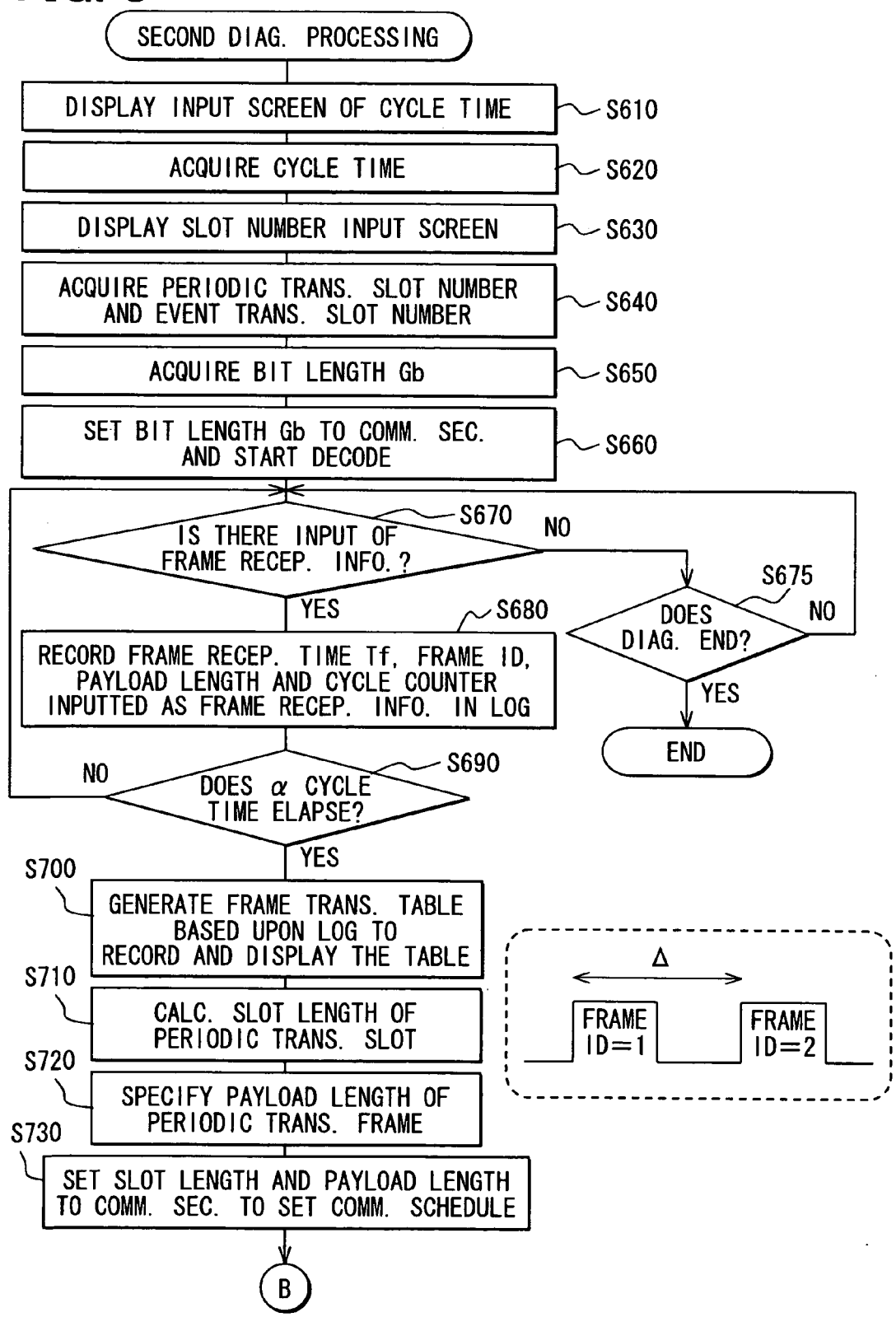
FIG. 8 is a flow chart illustrating diagnosis processing performed by an exemplary control section in accordance with an embodiment.
Figure 9:
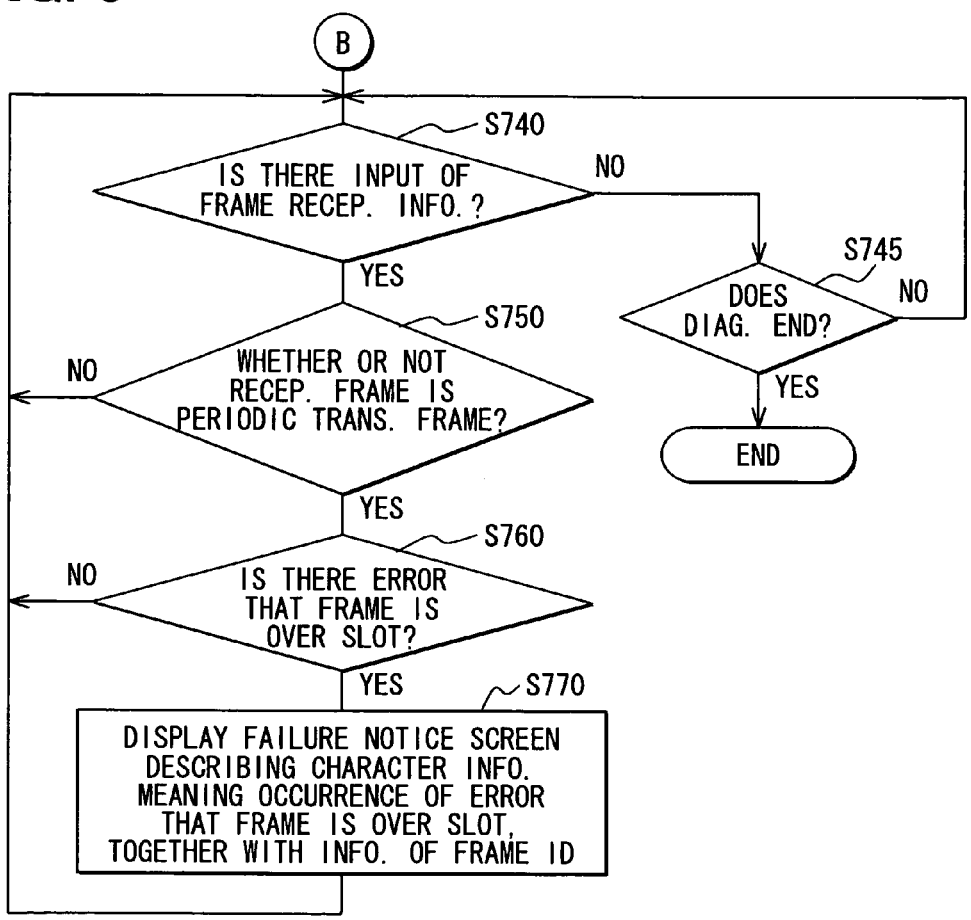
FIG. 9 is a flow chart further illustrating diagnosis processing performed by an exemplary control section in accordance with an embodiment.

Next, the second diagnosis processing executed by the control section 11 will be explained with reference to FIG. 8 and FIG. 9. FIG. 8 and FIG. 9 are flow charts each showing the second diagnosis processing executed by the control section 11 when an execution command of the second diagnosis processing is inputted through the input section 19 from an outside as an operator to the control section 11.

When the second diagnosis processing is started, the control section 11 first displays on the display section 17 a cycle time input screen for making an operator input into the communication system 30 a cycle time, which is a time length of a communication cycle, as the diagnosis object at S610, and acquires information of the cycle time from outside the system such as from an operator through the input section 19 at S620.

When above described process is completed, the control section 11 displays on the display section 17 a slot number input screen for making an operator input a periodic transmission slot number and an event transmission slot number of the communication system 30 at S630 and acquires information of the periodic transmission slot number and the event transmission slot number from an outside through the input section 19 at S640.

When the above described process is completed, the control section 11 activates the velocity measuring section 23 to acquire a bit length Gb of the communication system 30 from the velocity measuring section 23 at S650 and sets the acquired bit length Gb to the communication section 21 to activate the decode processing section 211 at S660.

When the decode processing section 211 is thus activated, the frame reception information is inputted to the control section 11 from the communication section 21 for each time of receiving the frame. Accordingly, after completing the process of S660, the control section 11 stands by until the frame reception information is inputted from the communication section 21 or the diagnosis end command is inputted from an outside at S670 to 5675.

When the frame reception information is inputted to the control section 11 from the communication section 21, corresponding to YES at S670, reception history information provided by associating information of the reception time Tf of the frame with header information of the frame, such as the frame ID, payload length and information of cycle counter, based upon the frame reception information is recorded in the log file at S680.

When the above described process is completed, processing proceeds to S690, where the control section 11 determines whether a time $\alpha$ has elapsed with a value as much as the cycle time, after the frame reception information at the first time is inputted. In addition, when it is determined that the time $\alpha$ has not elapsed, corresponding to NO at S690, processing proceeds to S670. As long as a diagnosis end command is not inputted, the process of recording the reception history information in regard to the frame received by the communication section 21 in the log file is repeatedly performed until the time $\alpha$ having a value as much as the cycle time elapses at S670 to S690. When the time $\alpha$ having a value as much as the cycle time elapses, corresponding to YES at S690, processing proceeds to S700. When the diagnosis end command is inputted from the input section 19, corresponding to a determination of YES at S675, the second diagnosis processing ends.

When processing proceeds to S700, the control section 11 produces a frame transmission table of construction shown in FIG. 10 based upon the content of the log file stored in the storage section 13, and stores the produced frame transmission table in the storage section 13 and also displays the table on the display section 17. FIG. 10 is an explanatory diagram showing the construction of the frame transmission table.

As shown in FIG. 10, the frame transmission table describes whether the frame in which values of the cycle counter and the frame ID are described is transmitted for each value of the cycle counter and for each frame ID. More specially, the frame transmission table is displayed as an image depicting on the display section 17, for example, a check pattern having a column representing the number corresponding to a sum of the periodic transmission frame number and the event transmission frame number and rows of numbers, where each row corresponds to a total number a of values which the cycle counter can tolerate. In addition, in the frame transmission table, squares corresponding to the received frames are marked out to express that the corresponding frame is transmitted.

Further, when the process at S700 is completed, processing proceeds to S710, where the control section 11 calculates a slot length of the periodic transmission slot in the communication system 30 as the diagnosis object based upon the content of the log file stored in the storage section 13. More specifically, a difference in reception frame time between neighboring periodic transmission slots is calculated as the slot length.

For example, at S710, the reception history information recorded in the log file is selected as one processing object. The control section 11 determines whether the frame ID shown in the reception history information of the processing object is the frame ID of the periodic transmission slot. When the control section 11 determines that the frame ID is the frame ID of the periodic transmission slot, the reception history information of the processing object showing the next frame ID of the corresponding frame ID and showing the same cycle counter value is searched in the log file as a comparative object. When the reception history information associated with the comparative object is found in the log file, an absolute value $\Delta$ of a difference between the frame reception time shown by the reception history information of the processing object and the frame reception time shown by the reception history information of the comparative object is calculated. However, in a case where the frame ID shown by the reception history information of the comparative object is the frame ID of the event transmission slot, the value Δ is not calculated.

Such a process is executed for each reception history information recorded in the log file to calculate a plurality of values Δ. A slot length of the periodic transmission slot in the communication system 30 is calculated based upon these values Δ. For one example, an average value of these values Δ is calculated as the slot length. As another example, some percentage of the large values Δ and some percentage of the small values Δ among these values Δ can be eliminated to calculate an average value of the remaining values Δ as the slot length.

When the above described process is completed, processing proceeds to S720, where the control section 11 specifies a payload length of the periodic transmission slot based upon the reception history information in the reception transmission slot recorded in the log file. For example, among the payload lengths shown by the reception history information, the payload length recorded absolutely in many amounts in the log file is specified as the payload length of the periodic transmission slot in the communication section 30.

When the above described process is completed, processing proceeds to S730, where the control section 11 sets the slot length calculated at S710 and the payload length specified at S720 to the communication section 21. At S730, the control section 11 further sets the cycle time acquired at 5620 and the periodic transmission slot number and event transmission slot number acquired at S640 to the communication section 21 in order to set a communication schedule.

When the control section 11 thus sets the slot length and the payload length to the communication section 21, the error determining section 217 becomes operable and is activated in the communication section 21. Further, when the error determining section 217 is activated, frame reception information containing information of frame reception time Tf, header information and error determination information indicative of the determination result in the error determining section 217 is inputted to the control section 11.

When the process at S730 is completed, the control section 11 stands by until the frame reception information is inputted from the communication section 21 or the diagnosis end command is inputted through the input section 19 from an outside at S740 to S745. Then, when the frame reception information is inputted from the communication section 21, corresponding to YES at S740, the control section 11 determines whether the reception frame triggering input of the frame reception information is the periodic transmission frame based upon information of the frame ID inputted as the frame reception information at S750.

When the control section 11 determines that the reception frame is not the periodic transmission frame, corresponding to NO at S750, processing proceeds to S740 without executing the processes at S760 and S770 and the control section 11 stands by until the next frame reception information is inputted or the diagnosis end command is inputted.

When the control section 11 determines that the reception frame is associated with the periodic transmission frame, corresponding to YES at S750, processing proceeds to S760, where the control section 11 determines whether the error determination information contained in the frame reception information indicates an error condition that the frame duration exceeds the slot duration.

When the control section 11 determines that the error determination information indicates an error condition whereby the frame duration exceeds the slot duration, corresponding to YES at S760, the control section 11 displays a failure notice screen describing information indicating the occurrence of the error condition whereby the frame duration exceeds the slot duration, together with the frame ID of the reception frame on the display section 17. In addition, the control section 11 notifies an operator of the occurrence of the error condition at S770. Thereafter, processing proceeds to S740.

In contrast, when the control section 11 determines that the error determination information contained in the frame reception information indicates a normal condition, corresponding to NO at S760, processing proceeds to S740 without executing the process at S770.

When the frame reception information is newly inputted, the processes after S750 are executed. When the diagnosis end command is inputted through the input section 19, corresponding to YES at S745, the second diagnosis processing is ended.

Thus in the second diagnosis processing, it is checked whether the frame transmitted from the each node is correctly accommodated in the time slot. When the frame is not correctly accommodated in the time slot, the transmission failure is notified to an operator through the failure notice screen.

As described above, the diagnosis apparatus 10 of the present embodiment is explained, but when the diagnosis apparatus 10 is connected to the communication bus 31 to execute the second diagnosis processing, an operator can check whether the frame is properly transmitted in a constant period from each node without inputting information of a communication velocity such as is indicated by bit length or a frame transmission period Ts of each node in the communication system 30 to the diagnosis apparatus 10.

That is, when the diagnosis apparatus 10 of the present embodiment is used, an operator can simply check whether the frame is transmitted in an appropriate period from each node 33 without the transmission failure even if various communication parameters are not set to the diagnosis apparatus 10. In addition, the diagnosis apparatus 10 can check whether the system normally operates, for example, an application program normally generates data in each node 33 without delay. In other words, according to the present embodiment, it can be simply checked whether an appropriate transmission operation of data from each node 33 is made, thus diagnosing the communication system.

Particularly, in the present embodiment, the next frame reception time is predicted for each time of receiving the frame to detect the transmission failure in real time from a deviation ϵ between the next frame reception time predicted previously and the reception time of the received frame. Therefore, a notification of the failure of the transmission can be quickly provided to a user. That is, as soon as the notification of the failure is provided, an operator can investigate the cause and quickly correct the failure.

In the present embodiment, a slot length and a payload length required for operating the error determining section 217 are specified from the communication signal flowing in the communication bus 31 and are set to the communication section 21. Thereby, the error determining section 217 can be arranged to be operated in synchronization with the communication section 30 to check whether the node 33 correctly transmits the frame in the time slot such that the frame is fully accommodated within the time slot without requiring input of the slot length and the payload length from an operator. Therefore, according to the diagnosis apparatus 10, a detail diagnosis of the communication system can be easily carried out.

It should be noted that in the present embodiment, the velocity measuring section 23 in the embodiment corresponds to communication velocity measuring means. Signal processing means is realized by the processes at S390 and S660 executed by the control section 11, the decode processing section 211 and the processes of the reception time detecting section 213 and the header decoding section 215. Reception history storage means is realized by the processes at S410 and S680 executed by the storage section 13 and the control section 11. Transmission period estimating means is realized by the process at S540.

Further, transmission period failure determining means is realized by the processes at S550, S560 and S600. Predicting means is realized by the process at S600. Deviation calculating section is realized by the process at S550. Notice means is realized by the processes at S590 and S770. The error determining section 217 corresponds to frame failure determining means. Parameter setting means is realized by the processes at S710 to S730 executed by the control section 11.

The present invention is not limited to the aforementioned embodiment and can have various modifications. For example, in the aforementioned embodiment, the bit length of the communication system 30 is found by the communication signal flowing in the communication bus 31, but the control section 11 may be arranged to display the bit length input screen on the display section 17 at S380 and S650 and acquire information of the bit length through the input section 19 from an outside as an operator.

While the selected embodiments have been chosen to illustrate the invention, it will be apparent to those skilled in the art from the present disclosure that various changes and modifications can be made therein without departing from the scope of the invention. Furthermore, the foregoing description of the embodiments according to the present invention is provided for illustration only, and not for the purpose of limiting the invention as defined by the appended claims and their equivalents.

What is claimed is:

1. A diagnosis apparatus connected to a communication bus of a TDM communication system in which a plurality of time slots are assigned respectively to a plurality of nodes, each of the plurality of nodes periodically transmitting a frame in a corresponding one of the plurality of time slots, the frame containing an identification code of the corresponding time slot, the diagnosis apparatus for diagnosing a diagnosis object associated with the TDM communication system, the diagnosis apparatus comprising:

means for decoding a communication signal associated with the frame, the communication signal inputted from the communication bus, the decoding for specifying the identification code and a reception time of the frame;

means for storing the reception time and the identification code specified by the decoding means;

means for estimating a transmission period of the frame, the diagnosis object including the time slot, the estimating based upon the reception time and the identification code stored in the storing means;

means for determining whether the frame is transmitted in the transmission period estimated by the estimating means in the time slot after estimating the transmission period by the estimating means, the determining based upon the reception time and the identification code of the frame specified by the decoding means;

means for providing a notification of a failure of the TDM communication system when determining means determines that the frame is not transmitted in the estimated transmission period;

means for detecting an upward edge, in which the communication signal is switched upward, and a downward edge, in which the communication signal is switched downward, and measuring a communication velocity in communication between the plurality of nodes through the communication bus, the measuring based upon the communication signal inputted from the communication bus and a length between the upward edge and the downward edge, wherein the decoding means is arranged to decode the communication signal inputted from the communication bus, the decoding corresponding to the communication velocity measured by the measuring means to specify the identification code written in the frame and the reception time of the frame contained in the communication signal.

2. A diagnosis apparatus according to claim 1, wherein:
the determining means includes:
means for predicting the next reception time of the frame transmitted in the time slot when the diagnosis apparatus receives the frame transmitted in the time slot, the predicting based upon the reception time of the frame specified by the decoding means and the transmission period of the frame estimated by the estimating means; and
means for calculating a deviation between the reception time of the frame specified by the decoding means and the reception time of the frame predicted at the previous time by the predicting means when the frame transmitted in the time slot is received; and
the determining means is arranged to determine whether the frame is transmitted in the transmission period estimated by the estimating means in the time slot associated with the diagnosis object based upon the deviation calculated by the calculating means.

3. A diagnosis apparatus according to claim 2, wherein:
the determining means is arranged to determine:
that the frame is not transmitted in the transmission period estimated by the estimating means when the deviation calculated by the calculating means exceeds a reference value; and
that the frame is transmitted in the transmission period estimated by the estimating means when the deviation calculated by the calculating means is less than the given reference value.

4. A diagnosis apparatus according to claim 1, further comprising:
means for determining a failure based upon a communication parameter in advance set to determine whether each of the plurality of nodes normally transmits the frame in the assigned time slot from the communication signal flowing in the communication bus; and
means for deriving the communication parameter set to the means for determining the failure based upon the communication signal inputted from the communication bus and for setting the derived communication parameter to the means for determining the failure,
wherein the providing means is arranged to provide a notification of a failure of the communication when the means for determining the failure determines that the frame is not normally transmitted.

5. The diagnosis apparatus according to claim 1, wherein only in a case where, after the communication signal is switched upward or downward, the communication signal continues to be held in an upward or downward state for a plurality of times, the detecting means detects the switching to the upward or downward as the upward edge or the downward edge.

6. A method for diagnosing a diagnosis object in a communication system, a node of the communication system periodically transmitting a frame in a time slot, the frame containing an identification code of the corresponding time slot, the method comprising:

decoding a communication signal associated with the frame after estimating a bit length associated with the information in the frame, the decoding for specifying the identification code and a reception time of the frame;

storing the reception time and the identification code;

estimating a transmission period of the frame, the diagnosis object including the time slot, the estimating based on the reception time and the identification code stored during the storing and based on a previous stored reception time and a previous stored identification code;

determining whether the frame is transmitted in the time slot in the estimated transmission period after estimating the transmission period, the determining based upon the reception time and the identification code of the frame;

providing a notification of a failure of the TDM communication system when it is determined that the frame is not transmitted in the estimated transmission period;

detecting an upward edge, in which the communication signal is switched upward, and a downward edge, in which the communication signal is switched downward;

measuring a communication velocity in communication between the plurality of nodes through the communication bus, the measuring based upon the communication signal inputted from the communication bus and a length between the upward edge and the downward edge, wherein, in decoding the communication signal associated with the frame, the estimating the bit length associated with the information in the frame is based on the measured communication velocity.

7. A method for diagnosing according to claim 6, wherein:

the determining whether the frame is transmitted includes:

predicting the next reception time of the frame transmitted in the time slot when the frame transmitted in the time slot is received, the predicting based upon the specified reception time of the frame and the estimated transmission period of the frame; and calculating a deviation between the specified reception time of the frame and the predicted next reception time of the frame when the frame transmitted in the time slot is received; and determining whether the frame is transmitted in the transmission period in the time slot associated with the diagnosis object based upon the calculated deviation.

8. A method for diagnosing according to claim 7, wherein:

the determining whether the frame is transmitted further includes determining:

that the frame is not transmitted in the estimated transmission period when the deviation exceeds a reference value; and that the frame is transmitted in the estimated transmission period when the deviation is less than the given reference value.

9. A method for diagnosing according to claim 6, further comprising:

determining a frame failure based upon a communication parameter set in advance to determine whether the node normally transmits the frame in the assigned time slot; and deriving the communication parameter associated with determining the frame failure based upon the communication signal and setting the derived communication parameter in the communication system, providing a notification of the frame failure when it is determined that the frame is not normally transmitted.

10. The method according to claim 6, wherein only in a case where, after the communication signal is switched upward or downward, the communication signal continues to be held in an upward or downward state for a plurality of times, the switching to the upward or downward is detected as the upward edge or the downward edge.

11. A diagnosis apparatus connected to a communication bus of a TDM communication system in which a plurality of time slots are assigned respectively to a plurality of nodes, each of the plurality of nodes periodically transmitting a frame in a corresponding one of the plurality of time slots, the frame containing an identification code of the corresponding time slot, the diagnosis apparatus for diagnosing a diagnosis object associated with the TDM communication system, the diagnosis apparatus comprising:

means for decoding a communication signal associated with the frame, the communication signal inputted from the communication bus, the decoding for specifying the identification code and a reception time of the frame;

means for storing the reception time and the identification code specified by the decoding means;

means for estimating a transmission period of the frame, the diagnosis object including the time slot, the estimating based upon the reception time and the identification code stored in the storing means;

means for determining whether the frame is transmitted in the transmission period estimated by the estimating means in the time slot after estimating the by the transmission period estimating means, the determining based upon the reception time and the identification code of the frame specified by the decoding means;

means for providing a notification of a failure of the TDM communication system when the determining means determines that the frame is not transmitted in the estimated transmission period;

means for measuring a communication velocity in communication between the plurality of nodes through the communication bus, the measuring based upon the communication signal inputted from the communication bus, wherein the decoding means is arranged to decode the communication signal inputted from the communication bus, the decoding corresponding to the communication velocity measured by the measuring means to specify the identification code written in the frame and the reception time of the frame contained in the communication signal;

the determining means includes:

means for predicting the next reception time of the frame transmitted in the time slot when the diagnosis apparatus receives the frame transmitted in the time slot, the predicting based upon the reception time of the frame specified by the decoding means and the transmission period of the frame estimated by the estimating means; and means for calculating a deviation between the reception time of the frame specified by the decoding means and the reception time of the frame predicted at the previous time by the predicting means when the frame transmitted in the time slot is received; and the determining means is arranged to determine whether the frame is transmitted in the transmission period estimated by the estimating means in the time slot associated with the diagnosis object based upon the deviation calculated by the calculating means.

12. A diagnosis apparatus according to claim 11, wherein:
the determining means is arranged to determine:
that the frame is not transmitted in the transmission period estimated by the estimating means when the deviation calculated by the calculating means exceeds a reference value; and
that the frame is transmitted in the transmission period estimated by the estimating means when the deviation calculated by the calculating means is less than the given reference value.

13. A method for diagnosing a diagnosis object in a communication system, a node of the communication system periodically transmitting a frame in a time slot, the frame containing an identification code of the corresponding time slot, the method comprising:
decoding a communication signal associated with the frame after estimating a bit length associated with the information in the frame, the decoding for specifying the identification code and a reception time of the frame;
storing the reception time and the identification code;
estimating a transmission period of the frame, the diagnosis object including the time slot, the estimating based on the reception time and the identification code stored during the storing and based on a previous stored reception time and a previous stored identification code;
determining whether the frame is transmitted in the time slot in the estimated transmission period after estimating the transmission period, the determining based upon the reception time and the identification code of the frame;
providing a notification of a failure of the TDM communication system when it is determined that the frame is not transmitted in the estimated transmission period;
measuring a communication velocity in communication between the plurality of nodes through the communication bus, the measuring based upon the communication signal inputted from the communication bus,
wherein, in decoding the communication signal associated with the frame, the estimating the bit length associated with the information in the frame is based on the measured communication velocity;
the determining whether the frame is transmitted includes:
predicting the next reception time of the frame transmitted in the time slot when the frame transmitted in the time slot is received, the predicting based upon the specified reception time of the frame and the estimated transmission period of the frame; and
calculating a deviation between the specified reception time of the frame and the predicted next reception time of the frame when the frame transmitted in the time slot is received; and
determining whether the frame is transmitted in the transmission period in the time slot associated with the diagnosis object based upon the calculated deviation.

14. A method for diagnosing according to claim 13, wherein:
the determining whether the frame is transmitted further includes determining:
that the frame is not transmitted in the estimated transmission period when the deviation exceeds a reference value; and
that the frame is transmitted in the estimated transmission period when the deviation is less than the given reference value.

* * * * *